United States Patent [19]

Weinberg

[11] 4,312,568
[45] Jan. 26, 1982

[54] PROJECTION SCREEN ASSEMBLY

[75] Inventor: Ulli Weinberg, Roth, Fed. Rep. of Germany

[73] Assignee: Messrs. Reflecta GmbH Foto Film Projektion, Schwabach, Fed. Rep. of Germany

[21] Appl. No.: 110,703

[22] Filed: Jan. 9, 1980

[30] Foreign Application Priority Data

Jan. 20, 1979 [DE] Fed. Rep. of Germany ... 7901492[U]

[51] Int. Cl.³ .............................................. G03B 21/56
[52] U.S. Cl. .................................................... 350/117
[58] Field of Search ......................................... 350/117

[56] References Cited

U.S. PATENT DOCUMENTS 2,774,421  12/1956  Lion ................................ 350/117 X

FOREIGN PATENT DOCUMENTS 619862  9/1933  Fed. Rep. of Germany ...... 350/117

Primary Examiner—Richard A. Wintercorn

[57] ABSTRACT

The invention relates to a projection screen assembly comprising a stand (1) in relation to which a housing (5) receiving a screen (6) coated on both sides can be turned out of a vertical inoperative position into a horizontal operative position, two different operative positions being provided, in each of which an outlet slot (7) in the housing (5) is disposed at the top and one of the two projection surfaces can be pulled out of the housing (5) to be directed away from the stand (1). In order that the housing (5) of such an assembly can be brought into the correct one of the two horizontal operative positions and thereby avoid damage to the cloth (6) forming the screen, the invention proposes that the mounting (4) consists of two parts (12, 13) which are connected by a hinge permitting pivotal movement about a pivot pin (15) parallel to the longitudinal axis of the housing (5) and of which the first part (12) is fixed to the housing at the side (11) thereof opposite to the slot (7) and the second part (13) is pivoted to the stand (1) about a horizontal axis (9) transverse to the pivot pin (15), that the slot (7) in the housing (5) in the vertical inoperative position thereof is disposed diametrically opposite to the stand in substantially one vertical plane with the longitudinal edge of the housing (5) and the stand (1), and that the two parts (12, 13) of the mounting (4) are operatively coupled by a drive (19, 20) which, on rotation of the housing (5) out of the vertical inoperative position (FIG. 1) into one of the horizontal operative positions (FIGS. 2, 3), necessarily causes the first part (12) to pivot to a position in which the slot (7) in the housing (5) is at the top.

10 Claims, 5 Drawing Figures

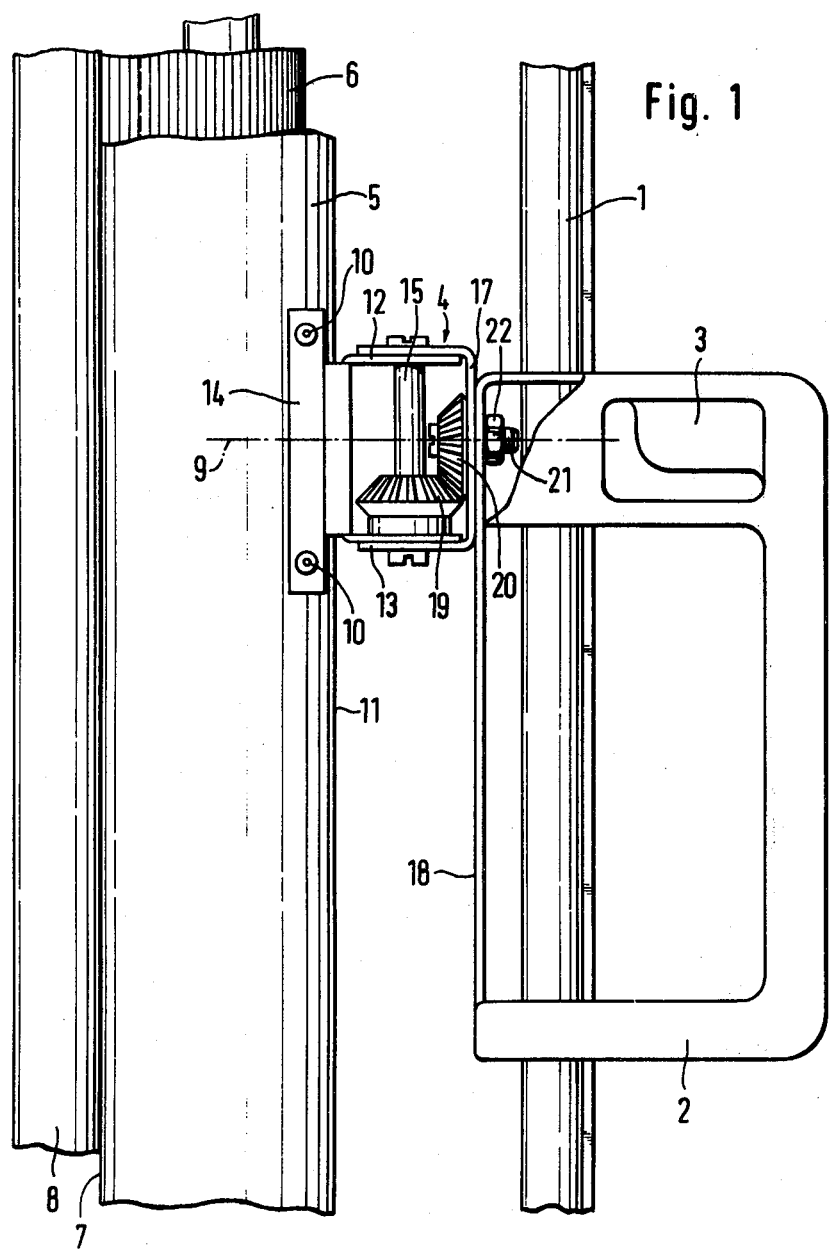

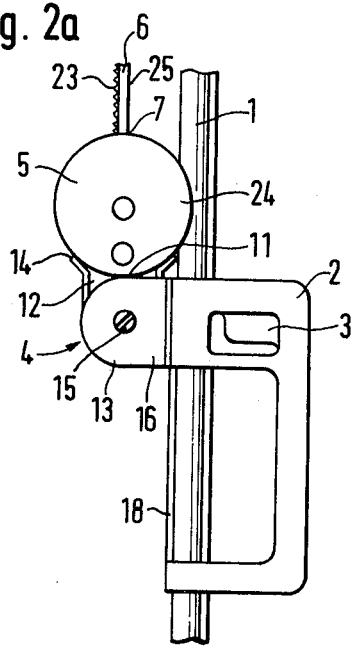
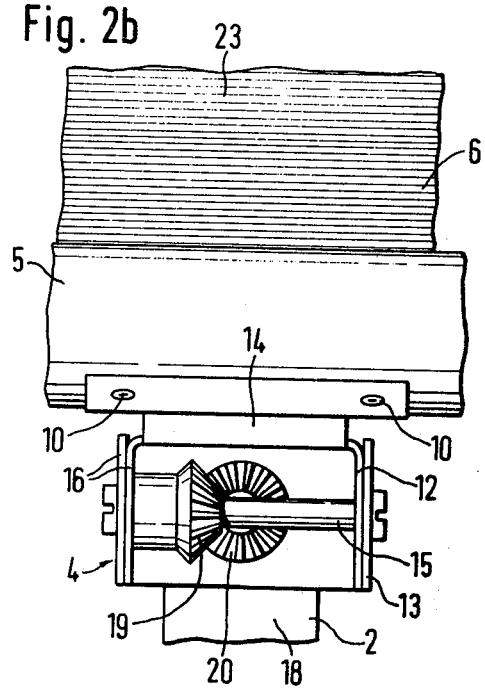
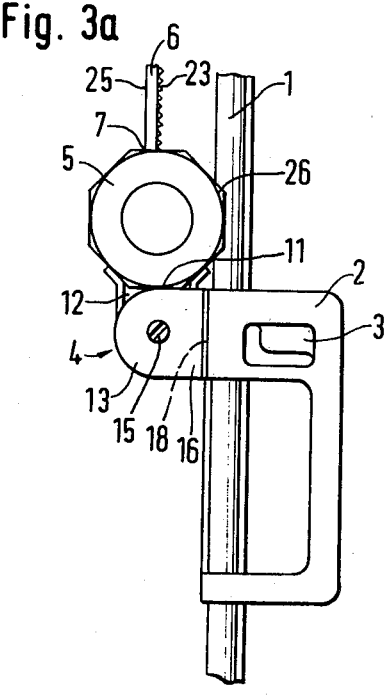
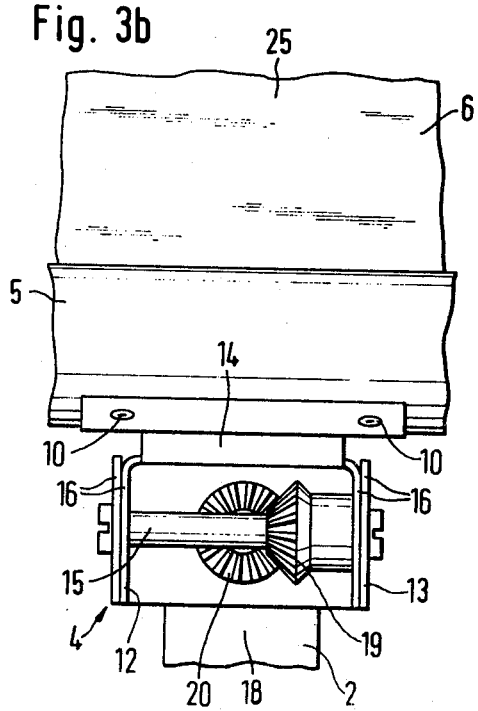

PROJECTION SCREEN ASSEMBLY

The invention relates to a projection screen assembly comprising a stand and a housing which accommodates the rolled-up screen and is connected to the stand by a mounting permitting the housing to be turned between a horizontal operative position and a vertical inoperative position parallel to the stand, said housing being provided with an outlet slot for the screen that is at the top in the operative position of the housing, said screen having different projection surfaces on opposite sides, wherein said mounting is constructed so that the housing can be brought into two different horizontal operative positions in each of which the slot is disposed at the top of the housing and the screen can, depending on the operative position, be pulled out of the housing with a corresponding one of the projection surfaces directed away from the stand.

Such a projection screen assembly is known from DE-GM No. 7808392. In screens having two different projection surfaces on the different sides of the cloth, there is the problem of being able to bring the housing receiving the rolled-up screen into two different operative positions relatively to the stand, one of the projection surfaces of the screen pointing away from the stand and thus towards the viewer in the one operative position and the second projection surface doing so in the other operative position. This problem is solved in the known screen by a mounting having different portions which are fixed with respect to the housing and are disposed on different sides of the slot for selective engagement with a countermember fixed with respect to the stand. In the first embodiment, this basic concept is embodied in that the housing for the screen is releasably connected to the stand by way of retaining lugs. On the one hand, this has the disadvantage of comparatively little stability. On the other hand, the manipulation of this screen assembly is understandably comparatively cumbersome because the housing must always be suitably located on the stand, for which purpose an angle on the known screen assembly is introduced in a slit and a screw connection must also be made.

In another embodiment of the projection screen assembly described in DE-GM 7808392, the aforementioned problem is solved by using a slideway which almost completely surrounds the housing and co-operates with a slide fixed with respect to the stand. This embodiment is likewise disadvantageous. The construction involving a slide and slideway is expensive, there also being the danger that the slide will jam in the slideway on careless manipulation. Further, no lock is provided for this projection screen assembly and therefore the stability leaves much to be desired.

Finally, both projection screen assemblies have the disadvantage that bringing the housing into the correct position depends on the abilities of the user and the thought he gives to this operation. Careless users could align the housing so that the outlet slot faces downwardly and the screen would then extend upwards about the sharp edge of the slot, in which case there is of course a danger of damaging the screen or cloth.

The invention is based on the problem of improving the known projection screen assemblies so that the housing for the rolled-up screen will always assume the correct position when it is brought out of the vertical inoperative position into one horizontal operative position, without the need for the user to execute relative complicated manipulations or even making it possible for the housing to move to an incorrect position which might result in damage to the cloth.

To solve this problem, the invention provides for the construction of a projection screen assembly of the aforementioned kind in a manner such that the mounting consists of two parts which are connected by a hinge permitting pivotal movement about a pivot pin parallel to the longitudinal axis of the housing and of which the first part is fixed to the housing at the side thereof opposite to the slot and the second part is pivoted to the stand about a horizontal axis transverse to the pivot pin, further that the slot in the housing in the vertical inoperative position thereof is disposed diametrally opposite to the stand in substantially one vertical plane with the longitudinal axis of the housing and the stand, and finally that the two parts of the mounting are operatively coupled by a drive which, on rotation of the housing out of the vertical inoperative position into one of the horizontal operative positions, necessarily causes the first part to pivot to a position in which the slot in the housing is at the top.

In the projection screen assembly according to the invention, therefore the special construction of the mounting and the gearing which brings about positive coupling of the parts of the mounting and thus a forced motion of the housing during rotation thereof relatively to the stand ensure that the housing will, during pivoting from the vertical inoperative position to the horizontal operative position that must normally be carried out in any case, be simultaneously pivoted upwardly as required so that the slot for the screen will always be disposed at the top. Depending on the rotary motion of the housing relatively to the stand, namely clockwise or anti-clockwise, the housing will be turned in a corresponding manner to ensure that the desired one of the two projection surfaces will be directed away from the stand to face the viewer. The screen assembly according to the invention can therefore be manipulated without particular difficulty by relatively unskilled users. In addition, provision is made to prevent the housing from being brought into a position in which the slot is directed downwardly and consequently damage of the screen is unlikely to occur.

Obviously countless embodiments for the drive are conceivable; for example, it would be possible to use a lever drive. However, a particularly simple construction is obtained if the drive is formed by interengaging gears of which the first gear is fixed for rotation together with the first part coaxial with the pivot pin of the hinge whilst the second gear is coaxial with the horizontal axis and fixed against rotation relatively to the stand but rotation of the second part being possible relatively to the second gear. The gears of the drive are preferably bevel gears. Such a gear drive firstly requires no substantial additional expenditure and secondly is comparatively stable but nevertheless fulfils its requirements without difficulties.

When using a gear drive, it is preferred that the mounting shaft for the first gear be at the same time constructed as a hinge pin for pivotally connecting the two parts of the mounting and the mounting shaft for the second gear at the same time forms the horizontal axis for pivoting the second part of the mounting to the stand, because in that case a compact construction is possible and the number of required components is kept small.

The parts of the mounting are desirably each substantially U-shaped, pivotally interconnected by the hinge near the free ends of their limbs about the pivot pin parallel to the webs of the U, and located by their webs at the housing and stand, respectively. Such U-shaped mounting parts are sufficiently strong and are also simple and therefore producible at low costs.

If the housing lies laterally against the stand above the mounting in each operative position, a particularly stable position of the screen or projection surfaces is obtained during use of the projection screen assembly.

To permit adjustment of the stand to different projection heights, the second part of the mounting and possibly the second gear may be secured to a handle which is displaceable along the stand in known manner.

Finally, it is within the scope of the invention for the two projection areas to be provided with dark borders of different sizes. For example, one of the projection surfaces may have a square dark border while the other projection surface has a rectangular border corresponding to the conventional narrow film size (16 mm or Super 8). In that case one of the projection surfaces having the square border would be used for projecting slides whereas the other projection surface with the rectangular border would be employed for projecting narrow cine film. However, the projection surfaces could of course be different in some other manner, e.g. be of a different surface structure.

Other features, details and advantages of the invention will become evident from the following description of a preferred example of a projection screen assembly with reference to the drawing, wherein:

FIG. 1 is a side elevation of the mounting as well as those parts of the housing and stand of the assembly in its inoperative position that are necessary for an understanding of the invention;

FIG. 2a is a side elevation corresponding to FIG. 1 in the first operative position;

FIG. 2b is a front elevation corresponding to FIG. 2a;

FIG. 3a is an elevation corresponding to FIG. 2a but in the second operative position, and FIG. 3b is a front elevation corresponding to FIG. 3a.

The projection screen assembly according to the invention comprises a stand 1 formed by a vertical rod along which a handle 2 is vertically adjustable. To release the lock between the handle 2 and stand 1, there is a key 3.

A tubular housing 5 for the screen 6 which is to be wound and unwound in known manner is connected to the handle 2 by way of a mounting 4. The screen 6 can be pulled out of an outlet slot 7 in the housing 5. By means of its end strip 8, which normally carries a lug or the like (not shown), it can then be suspended from a hook provided at the upper end of the tube 1 of the stand, for which purpose it is necessary for the housing 5 to be brought to a horizontal operative position in which the slot 7 is disposed at the top.

As is known from screen assemblies comprising a stand and a screen accommodated in a housing, the mounting 4 is mounted on the stand 1 or handle 2 for rotation about a horizontal axis 9. On the other hand, it is fixed to the housing by means of rivets 10 or the like, namely at the side 11 of the housing opposite to the slot 7.

The peculiarity of the screen assembly as illustrated resides in the special construction of the mounting 4. The latter consists of two parts 12 and 13 which are substantially U-shaped in cross-section, the first part 12 being fixed to the housing 5 by an extension 14 whilst the second part 13 can be turned about the horizontal axis 9 relatively to the handle 2 or stand 1. The two parts 12, 13 of the mounting 4 are interconnected by a pivot pin 15 forming a hinge, the pivot pin 15 passing through the limbs 16 of the parts 12, 13 of the mounting 4. The extension 14 forms the web of the U of the first part 12 of the mounting 4. The web 17 of the second part 13 of the mounting 4 rotatably abuts the surface 18 of the handle 2. The two parts 12, 13 of the mounting 4 are further operatively coupled by way of a drive. This drive consists of a first bevel gear 19 and a second bevel gear 20. The first bevel gear 19 is seated on the pivot pin 15 and is connected for rotation together with the corresponding limb 16 of the first part 12. The second bevel gear 20 is secured to the wall 18 of the handle 2 by means of a shaft 21 and a nut 22 (FIG. 1) in a manner such that the second bevel gear 20 cannot be turned but the shaft 21 simultaneously forms the horizontal axis 9 for turning the second part 13 of the mounting 4 relatively to the handle 2 or stand 1.

If, now, the housing 5 with screen 6 is turned clockwise relatively to the stand 1 (from the left-hand side as viewed in FIG. 1) relatively to the handle 2 or the stand 1 out of the inoperative position shown in FIG. 1 into one of the operative positions, the interengaging gears 19, 20 roll on each other. As a result, the first part 12 of the mounting 4 and thus the housing 5 will, during this rotary movement of the housing 5 relatively to the stand 1, be simultaneously swung upwardly, namely into the position shown in FIGS. 2a and 2b in which, firstly, the outlet slot 7 in the housing 5 is pointed upwardly but at the same time the housing 5 and screen 6 are so arranged that the diagrammatically illustrated strongly cross-hatched projection surface 23 is directed away from the stand 1 towards the viewer. In this position, an end cap 24 faces the viewer if one looks at the screen from the right-hand side (FIG. 2a).

On the other hand, if the housing 5 with screen 6 is moved counter-clockwise as viewed from the left-hand side in FIG. 1, to leave the vertical inoperative position of FIG. 1 and reach one of the horizontal operative positions, then the first part 12 of the mounting is again swung upwardly by way of the gear drive 19, 20 so that the outlet slot 7 of the housing 5 is directed upwardly. However, the housing is now disposed in a position which is shown in FIG. 3a and differs from that of FIG. 2a because the second projection surface 25 shown to be blank in the drawing points away from the stand 1 and thus towards the audience. At the same time, when one looks at the screen from the right, one sees a knurled wheel 26 which is part of a known clamping device.

The position of the gears 19, 20 of the drive connecting the two parts 12, 13 of the mounting 4 in the two operative positions of FIGS. 2a and 3a is clearly evident from FIGS. 2b and 3b.

FIGS. 2a and 3a also show that in the operative positions the housing 5 lies laterally against the stand 1, whereby further movement of the housing beyond the horizontal operative position is prevented and the entire arrangement is additionally stabilized.

In conclusion, it is pointed out that the mounting and particularly the drive can be of different construction. In addition, the projection surfaces can be of substantially any form desired. In particular, the projection surfaces may be of the same construction but bear a different dark border which serves to mask those margins of a projected image which are not sharp.

I claim:

1. A projection screen assembly comprising: a stand having an essentially vertically extending longitudinal axis; a screen having two different projection surfaces on opposite sides; a housing accommodating the screen when rolled up and having a longitudinal axis and a slot permitting withdrawal of the screen from the housing; a mounting connecting the housing to the stand and so constructed that the housing can be turned from a vertical inoperative position essentially parallel to the stand, into two different horizontal operative positions; the mounting comprising two parts, a hinge connecting the two parts so as to permit pivotal movement about a pivot pin parallel to the longitudinal axis of the housing, the first part being fixed to the housing at the side thereof opposite to the slot, and the second part being pivoted to the stand about a horizontal axis transverse to the pivot pin, the slot in the housing in the vertical inoperative position thereof being disposed diametrically opposite to the stand in substantially one vertical plane with the longitudinal axis of the housing and the stand; and a drive operatively coupling the two parts of the mounting and constructed such that, upon rotation of the housing in one direction or the other, out of the vertical inoperative position into one or the other respectively of the horizontal operative positions, the first part is positively pivoted to a position in which the slot in the housing is at the top and the screen can be pulled out of the housing with one or the other of the projection surfaces respectively directed away from the stand.

2. A screen assembly according to claim 1, wherein the drive is formed by two interengaging gears, the first gear being fixed for rotation together with the first part coaxial with the pivot pin of the hinge, and the second gear being coaxial with the horizontal axis and fixed against rotation relative to the stand but rotation of the second part being possible relative to the second gear.

3. A screen assembly according to claim 2, wherein the gears of the drive are in the form of bevel gears.

4. A screen assembly according to claim 2, comprising a mounting shaft for the first gear constructed as a hinge pin for pivotally connecting the two parts of the mounting, and a mounting shaft for the second gear forming the horizontal axis for pivoting the second part of the mounting to the stand.

5. A screen assembly according to claim 3, comprising a mounting shaft for the first gear constructed as a hinge pin for pivotally connecting the two parts of the mounting, and a mounting shaft for the second gear forming the horizontal axis for pivoting the second part of the mounting to the stand.

6. A screen assembly according to any one of claims 1 to 5, wherein the two parts of the mounting are each substantially U-shaped, are pivotally interconnected by the hinge near the free ends of their limbs about the pivot pin parallel to the webs of the U-shaped parts, and are located by their webs at the housing and stand, respectively.

7. A screen assembly according to any one of claims 1 to 5, wherein the housing lies laterally against the stand above the mounting in each operative position.

8. A screen assembly according to any one of claims 1 to 5, wherein the second part of the mounting is secured to a handle which is displaceable along the stand.

9. A screen assembly according to any one of claims 2 to 5, wherein the second part of the mounting and the second gear are secured to a handle which is displaceable along the stand.

10. A screen assembly according to any one of claims 1 to 5, wherein the two projection surfaces are provided with dark borders of different sizes.

* * * * *